(12) United States Patent
Young

(10) Patent No.: US 8,373,971 B2
(45) Date of Patent: Feb. 12, 2013

(54) SUPERCAPACITORS USING NANOTUBE FIBERS AND METHODS OF MAKING THE SAME

(76) Inventor: Karl S. Young, Olympia, WA (US)

( * ) Notice: Subject to any disclaimer, the term of this patent is extended or adjusted under 35 U.S.C. 154(b) by 272 days.

(21) Appl. No.: 13/006,347

(22) Filed: Jan. 13, 2011

(65) Prior Publication Data

US 2011/0170236 A1  Jul. 14, 2011

Related U.S. Application Data

(60) Provisional application No. 61/294,773, filed on Jan. 13, 2010.

(51) Int. Cl.
*H01G 9/00* (2006.01)

(52) U.S. Cl. ........ 361/502; 361/503; 361/504; 361/512; 361/523; 361/525

(58) Field of Classification Search .................. 361/502, 361/503, 504, 508, 509–512, 516–519, 523–525, 361/528–529; 29/25.01–25.03
See application file for complete search history.

(56) References Cited

U.S. PATENT DOCUMENTS

| | | | |
|---|---|---|---|
| 6,628,504 B2 * | 9/2003 | Volfkovich et al. | 361/502 |
| 7,060,391 B2 * | 6/2006 | Gyenge et al. | 429/245 |
| 7,312,976 B2 * | 12/2007 | Kazaryan et al. | 361/502 |
| 7,365,962 B2 * | 4/2008 | Miura et al. | 361/537 |
| 7,443,650 B2 * | 10/2008 | Nedoshivin et al. | 361/502 |
| 7,881,042 B2 * | 2/2011 | Buiel et al. | 361/502 |

* cited by examiner

*Primary Examiner* — Nguyen T Ha
(74) *Attorney, Agent, or Firm* — Sinorica, LLC

(57) ABSTRACT

An electrochemical double layer capacitor utilizing nano-fibers in the electrodes for increased performance. The use of nano-fibers significantly increase the surface area of the opposing electrodes for greater levels of specific energy compared to traditional double layered capacitors using activated carbon.

18 Claims, 7 Drawing Sheets

SUPERCAPACITORS USING NANOTUBE FIBERS AND METHODS OF MAKING THE SAME

CROSS REFERENCE

Provisional patent application, titled "Supercapacitors Using Nanotube Fibers and Methods of Making the Same," Ser. No. 61/294,773 filed on Jan. 13, 2010 by Karl S. Young is incorporated by reference herein in its entirety.

FIELD OF THE INVENTION

The subject matter described herein relates to electrochemical double-layer capacitors (EDLC) utilizing nano fibers in the electrodes; such as, but not limited to carbon nanotube (CNT) fibers, filaments, yarns or threads.

BACKGROUND

Electrochemical double-layer capacitors, also known as double-layer capacitors (DLC) or supercapacitors or Ultracapacitors can generally be described as energy storage devices that can combine the higher energy storage potential of batteries with nearly the high energy transfer rate or high charging/discharging capabilities of conventional dielectric capacitors. Early versions of DLCs were used as motor startup capacitors for large engines in tanks and submarines. More recently, DLCs have been developed for use in smaller items such as PC Cards, flash photography devices in digital cameras, flashlights, portable media players, energy storage in electric vehicles for regenerative braking/accelerating and the like.

DEFINITIONS

Single-wall carbon nanotube (SWCNT)—mostly 1-nm in diameter and can be as long as 132,000,000 times the diameter. SWCNT yielded the highest energy storage values per weight.
Double-wall carbon nanotube (DWCNT)—ranges from 5-10 nm in diameter, and contains one concentric SWCNT inside the larger nanotube.
Multi-wall carbon nanotubes (MWCNT)—have 2 or more concentric CNT within the larger outer nanotube. MWCNTs performs well as a structural material, not very good for energy storage.

FIG. 1 illustrates a conventional double-layer capacitor 120, which is typically comprised of two inert porous electrode plates 102 separated by a porous insulator (also known as a separator film) 108 and filled with an electrolyte 116 to wet the electrode surfaces. These electrodes are typically aluminum foil coated with a thin layer of high-surface area material 118, such as activated carbon. When a voltage is applied between the electrodes, ions from the electrolyte are attracted to the oppositely charged electrode surfaces. There is no ion exchange or chemical reaction in a DLC, but a capacitive voltage builds up between the electrolyte ion layer and the oppositely charged activated carbon. Thus, electric charges accumulation the carbon surface from the electric field attraction from the electrolyte ion layer and the carbon surface. Capacitance, C, of any type of capacitor is proportional to the exposed or wetted surface area A of the electrode material and inversely proportional to the distance d between electrodes of opposite charge. That is, C is proportional to A/d. For the case of a DLC, very high C can be achieved because the effective surface area "A" of the activated carbon is hundreds to thousands times greater than the surface area of a metal-plate capacitor, and the effective spacing "d" between the electrolyte ions and the activated carbon is more than a thousand times smaller than the spacing between the plates of the metal-plate device. Thus, DLC capacitances can be many orders of magnitude greater than metal-plate capacitors. Because of their ability to store many orders of magnitude of charge more than standard capacitors, DLC are thus often given the tradenames "supercapacitor" or "ultracapacitor". The current best conventional supercapacitors only have a specific-energy of about 6-8 Wh/kg), where "specific-energy" is defined as the amount of stored energy per mass of the energy storage device. In contrast, lithium ion batteries typically have a specific-energy of about 120 Wh/kg.

Today, there is no cost-effective energy storage technology to integrate with renewable energy systems to provide energy when the renewable resource is not available. Wind farms have been a significant source of stress for the grid, because frequently the wind would appear during low-load periods. These additional input loads excessively stress many interconnects, which helps to weaken the grid. Affordable energy storage with high power-flux capability would solve this serious problem for our country. Other critical utility energy storage applications include: load-leveling, frequency regulation, peak-shifting, auxiliary, etc.

Accordingly, there is a need for a new supercapacitor that has increased effective electrode surface area that provides an increased overall energy density and with high power-density; along with long service life (>500,000 cycles) for numerous defense needs, power backup, personal electronics, electric rail, electric buses, electric vehicles (EV) and EV charging stations, etc.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention. In the drawings.

DETAILED DESCRIPTION

Embodiments are described herein in the context of DLCs or supercapacitors utilizing carbon nanotube filaments or yarns. Those of ordinary skill in the art will realize that the following detailed description is illustrative only, and is not intended to be in any way limiting. Other embodiments of the present invention will readily suggest themselves to such skilled persons having the benefit of this disclosure. Reference will now be made in detail to implementations of embodiment of the present invention as illustrated in the accompanying drawings. The same reference indicators will be used throughout the drawings and the following detailed description to refer to the same or like parts. The terms "DLC" and "supercapacitor" are used interchangeably throughout this application.

Embodiments of the present invention are generally directed to a next-generation supercapacitor that addresses the affordable energy storage needs as well as greatly increasing the specific-energy and energy-density for a given supercapacitor as discussed in the Background. Specifically, embodiments of the present invention include supercapacitors that utilize electrodes comprised of yarns or filamentous carbon nanotubes or CNT filaments. By further arranging the CNT yarns or filaments into tightly-packed, unidirectional columns or into a woven or non-woven fabric, these next-generation supercapacitors can yield significantly greater levels of specific-energy as compared to currently existing supercapacitors. Unidirectional CNT filaments as compared to woven or non-woven fabrics will have lower internal impedance for electron flow, therefore may yield a DLC with greater power-density or specific-power. This is due to the ballistic electron transport on the surface of carbon nanotubes in the axial direction, but not in the normal direction of the CNT axis. Laboratory tests show at least a 20× increase in specific-energy compared to current supercapacitors using single walled carbon nanotube (SWCNT) yarn/filament by University of Texas, Dallas.

Figure 1:
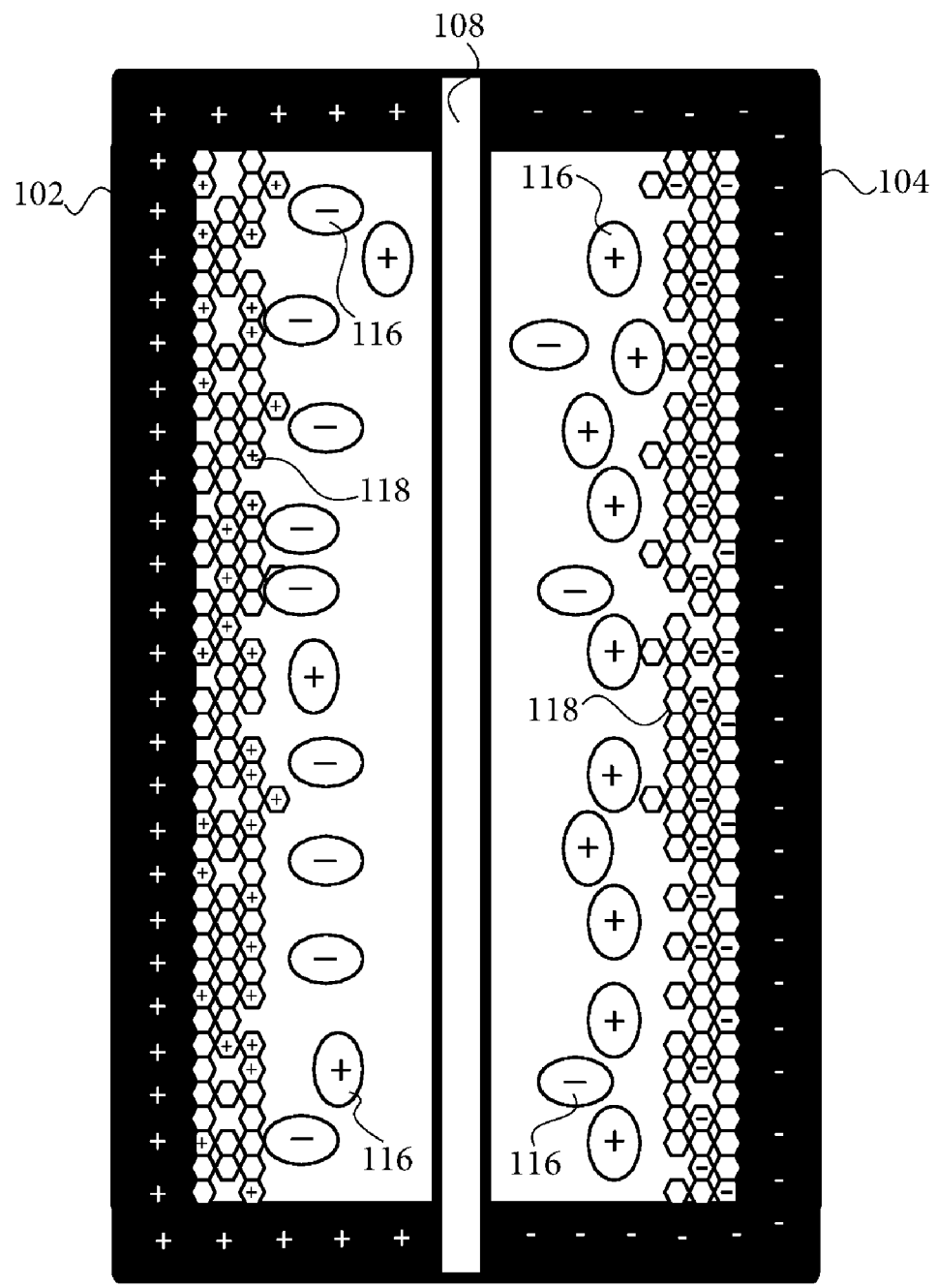
FIG. 1 is a schematic of a prior art conventional DLC comprised of activated carbon particles coating two electrodes, electrolyte, and a separator plate or barrier film.
Figure 2:
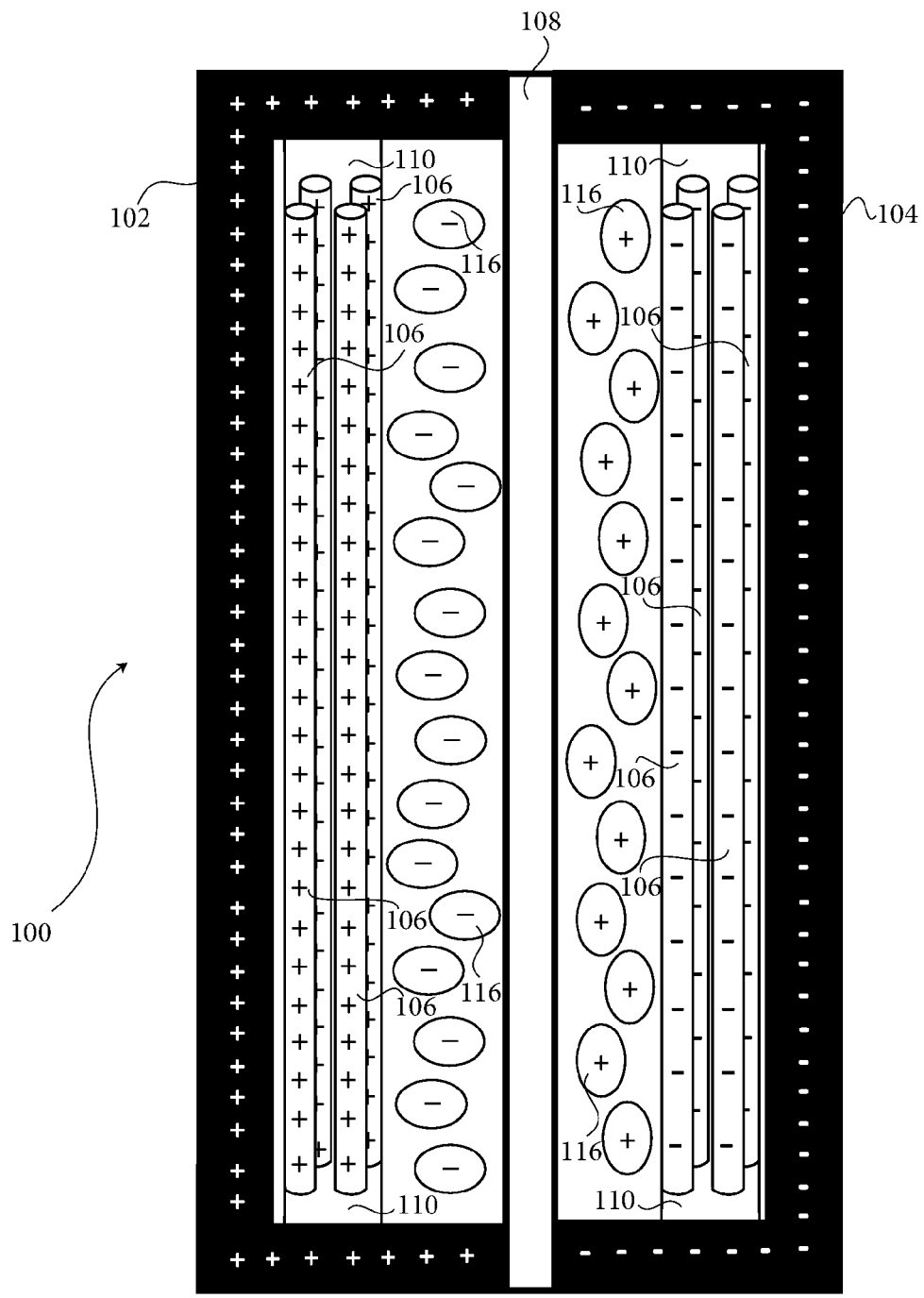
FIG. 2 illustrates a detailed representative side sectional view (XY plane) of a DLC or supercapacitor design in accordance with an embodiment of the present invention.
Figure 3:
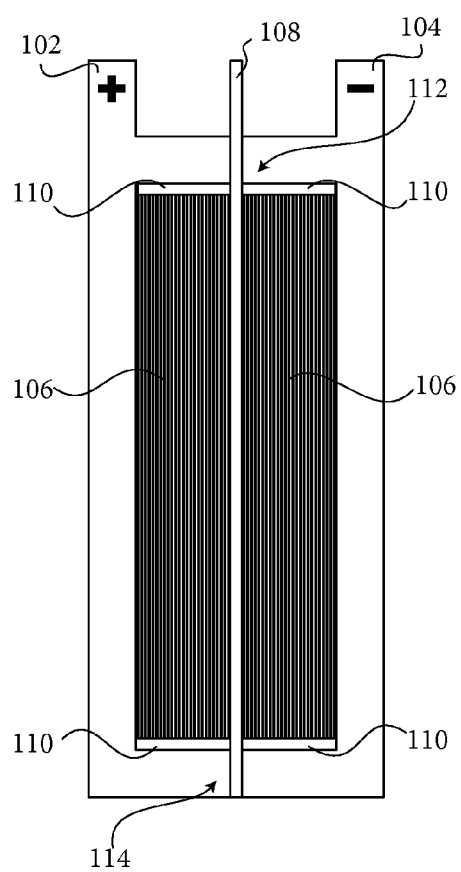
FIG. 3 illustrates a representative side sectional view (XY plane) of a DLC or supercapacitor design in accordance with an embodiment of the present invention.

FIG. 2-3 generally illustrates a representative side sectional view (XY plane) of a supercapacitor in accordance with an embodiment of the present invention. As illustrated in FIG. 2, supercapacitor 100 generally includes the following elements: current collector plates 102 and 104, a plurality of carbon nanotube yarns/filaments 106 (a yarn is a length of aligned bundle of CNTs slightly intertwined in a small diameter 1-20 microns as they are pulled/spun from the collection of CNTs and may or may not have a twist; the term filament is used interchangeably with yarn; and threads are yarns or filaments twisted into a larger diameter round bundle resembling a rope), an electrolyte (not shown, but wetting out the CNT yarns/filaments), porous separator film 108, and conductive joining compound 110.

In the embodiment of the invention illustrated in FIG. 2, supercapacitor 100 can be seen as including a plurality of electrodes 106 that are arranged as tightly-packed, unidirectional columns of carbon nanotube filaments between the two opposing ends 112, 114 of electrode frames 102, 104. Electrode frames 102, 104 are also current collectors providing an electrical path to the external environment. In an embodiment, one or both of the ends of the plurality of electrodes 106 can be bonded to plates 102 and 104 using conductive adhesive 110. In the embodiment illustrated in FIG. 2, both ends of the plurality of electrodes 106 have been bonded to plates 102, 104. In an embodiment, an electrolyte is in contact with and interposed between the plurality of electrodes 106 within supercapacitor 100. In an embodiment, separator film 108 provides a perforated non-conductive separator that separates the electrodes between the positively charged side of supercapacitor 100 and the negatively charged side of supercapacitor 100, while permitting the continuity of the electrolyte between the two sides of supercapacitor 100.

Figure 6:
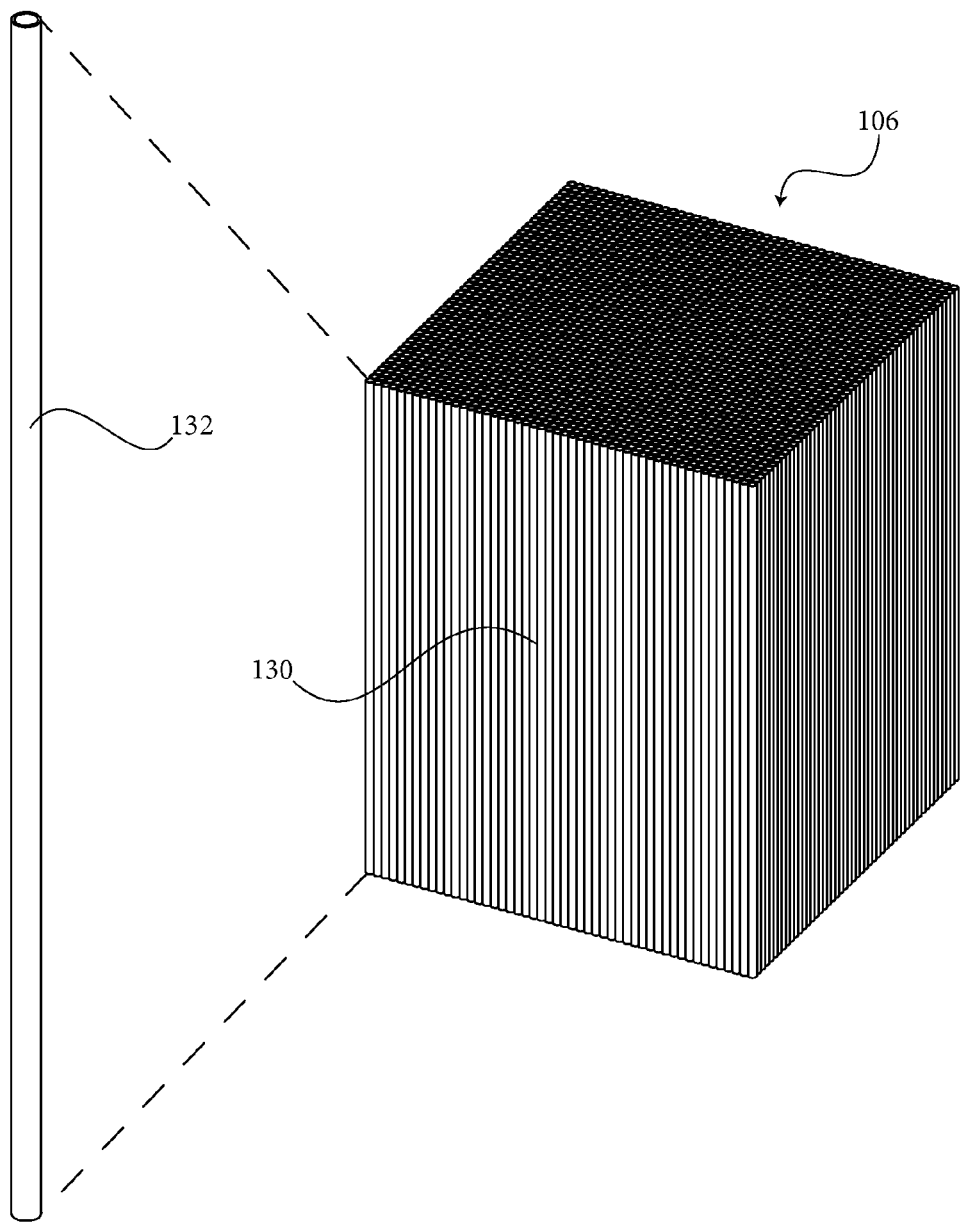
FIG. 6 illustrates an isometric view of a typical collection of filaments 106 within a DLC or supercapacitor design in accordance with an embodiment of the invention. The enlarged view of a filament 132 represents a single filament that contains over 10,000 nano-fibers or carbon nanotubes across its diameter. The nano-fibers or carbon nanotubes are in unidirectional alignment with the filament axis at any cross-section of the filament.

FIG. 6 schematically shows the nanotube fiber electrodes 106 in an embodiment of the invention. The electrodes 106 may be a bundle of a plurality of filaments 130. The plurality of filaments 130 is any type of filaments including threads, yarns, filaments, or strings. The plurality of filaments 130 are comprised of spun shorter nanotube fibers 132. Such fibers spun into filaments may be fabricated into continuous lengths as long as the precursor supply is sufficient.

The capacitance of supercapacitor 100 is increased given its novel arrangement of the plurality of electrodes 106. Referring again to FIG. 2, the plurality of electrodes 106 are illustrated as being lined up substantially uni-directionally and parallel to the plane of the separator film 108, which is shown extending in the YZ plane in FIG. 2 and FIG. 3. However, it is to be understood that the plurality of electrodes 106 can be packed together to form thin flat sheets or other cross-sectional configurations lying parallel to the plane of the separator film 108 in order to accommodate different size or configurations of supercapacitor 100. The important concept is the nanotubes or nano-fibers within a filament are bound together by van der Waal forces or by conductive binders, so that there are electrical connections between the fibers for the electrons to continue its travel to the current collector in the shortest distance or with the least electrical impedance.

Figure 4:
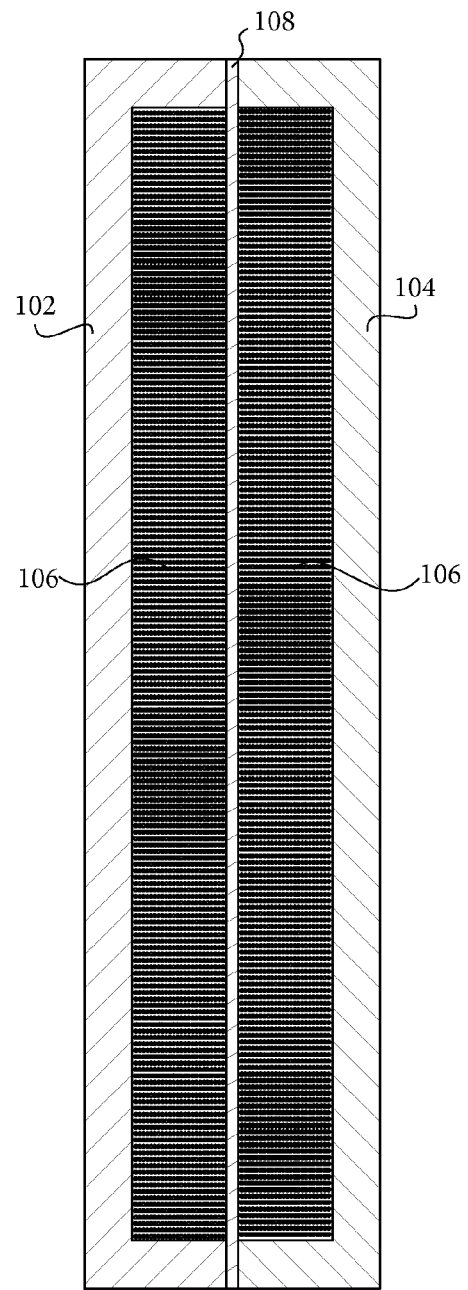
FIG. 4 illustrates a representative top sectional view (XZ plane) of a DLC or supercapacitor design in accordance with an embodiment of the invention.
Figure 5:
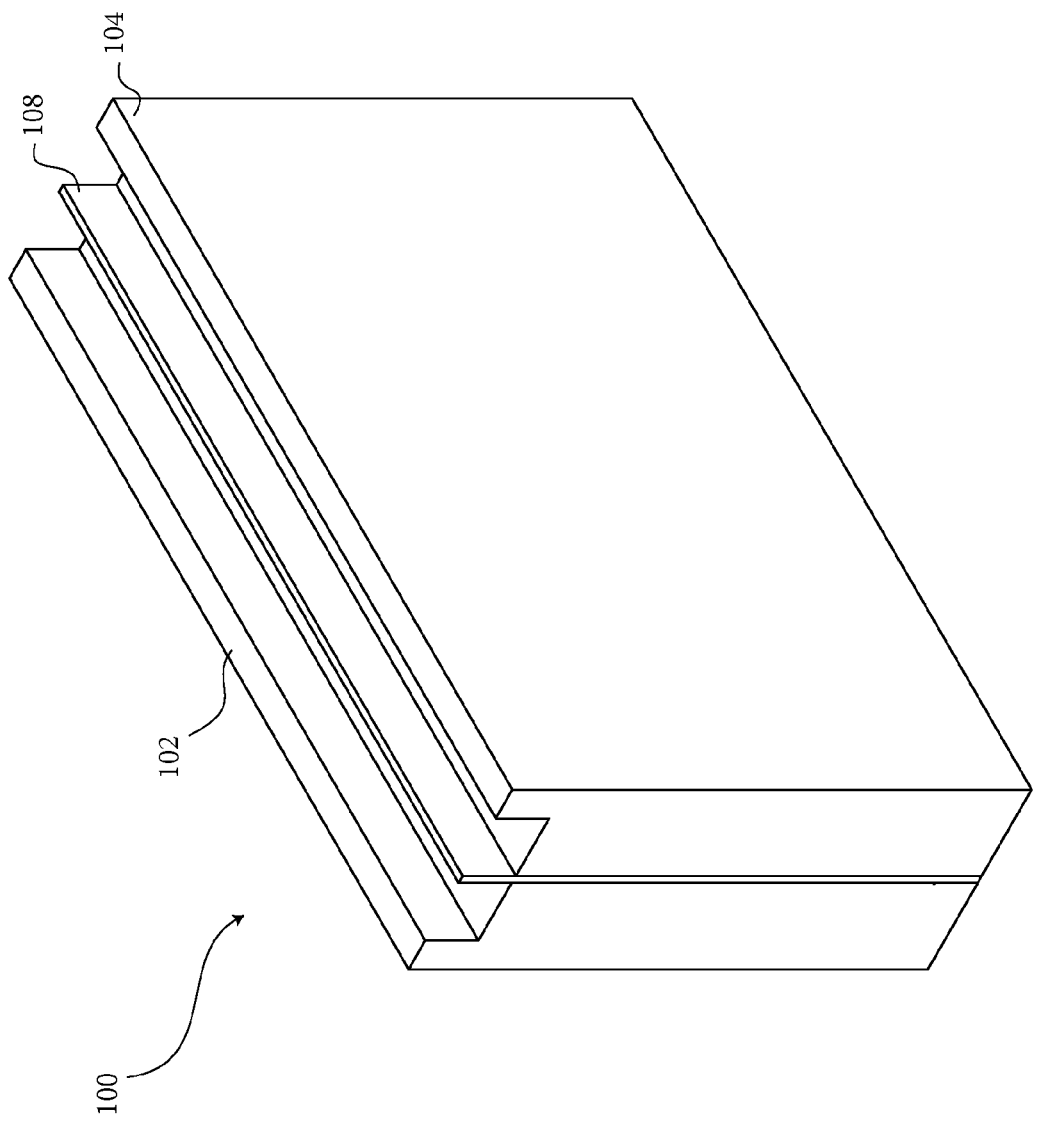
FIG. 5 illustrates a isometric view of a DLC or supercapacitor design in accordance with an embodiment of the invention.

FIG. 4 generally illustrates a representative top sectional view (designated in the figure as the XZ plane) of a supercapacitor 100 in accordance with an embodiment of the present invention. In this embodiment, supercapacitor 100 would generally look like a rectangular box if all sides of supercapacitor 100 were shown. That rectangular box has been cut in half through its XZ plane as depicted in FIG. 3 for illustrative purposes. FIG. 3 illustrates that a number of electrodes 106 can be densely packed within supercapacitor 100. This arrangement greatly increases the overall surface area of the plurality of electrodes 106, and consequently the capacitance of supercapacitor 100, for any given volume. It is to be understood, however, that supercapacitor 100 can have any other shape/dimensions as desired and still fall within the scope of this invention. In an embodiment, the arrangement of the plurality of electrodes 106 is analogous to the arrangement of bristles found on a paintbrush. In other words, the plurality of electrodes 106 can be arranged in a densely packed configuration, wherein the plurality of electrodes 106 collectively have a three dimensional shape within supercapacitor 100. Current supercapacitors using activated carbon can only have surfaces exposed to the electrolyte for charge storage, making it a 2-dimensional plane to store energy. One of the key features of this invention is the ability to have a 3-dimensional electrode to significantly increase the charge storage area without significant increase in weight and volume.

Applying a voltage differential on plates 102, 104 causes charge to build up (i.e., be stored) in the electric double-layer at the interface between the plurality of electrodes 106 and the electrolyte. The electrical energy is ultimately stored at the boundaries between the electrolyte and the plurality of electrodes 106.

More specifically, and illustrated in FIG. 2, when an electrical potential is applied to plates 102, 104, an electric field is established. The electrodes near the positively charged plate 102 become positively charged, and those electrodes near the negatively charged plate 104 become negatively charged. The resulting electric field causes negative electrolyte ions 116A to move toward the positive electrode and positive electrolyte ions 116B to move toward the negative electrode. These ions coat the electrode surfaces. As long as the nanotubes or nano-fibers within the filaments are wetted with electrolyte, the opposing voltage field would induce charge collection on the surfaces of the oppositely charged fibers. The higher the voltage, the thicker or deeper the electrode can be to sense the opposite voltage through the electrolyte. Ionic liquid is preferred for this invention, since it can operate as high as 5-6 volts compared to 2.5-3 volts for organic electrolytes. Energy storage in a capacitor has the following function with voltage:

$$E = \frac{1}{2}CV^2$$

Figure 7:
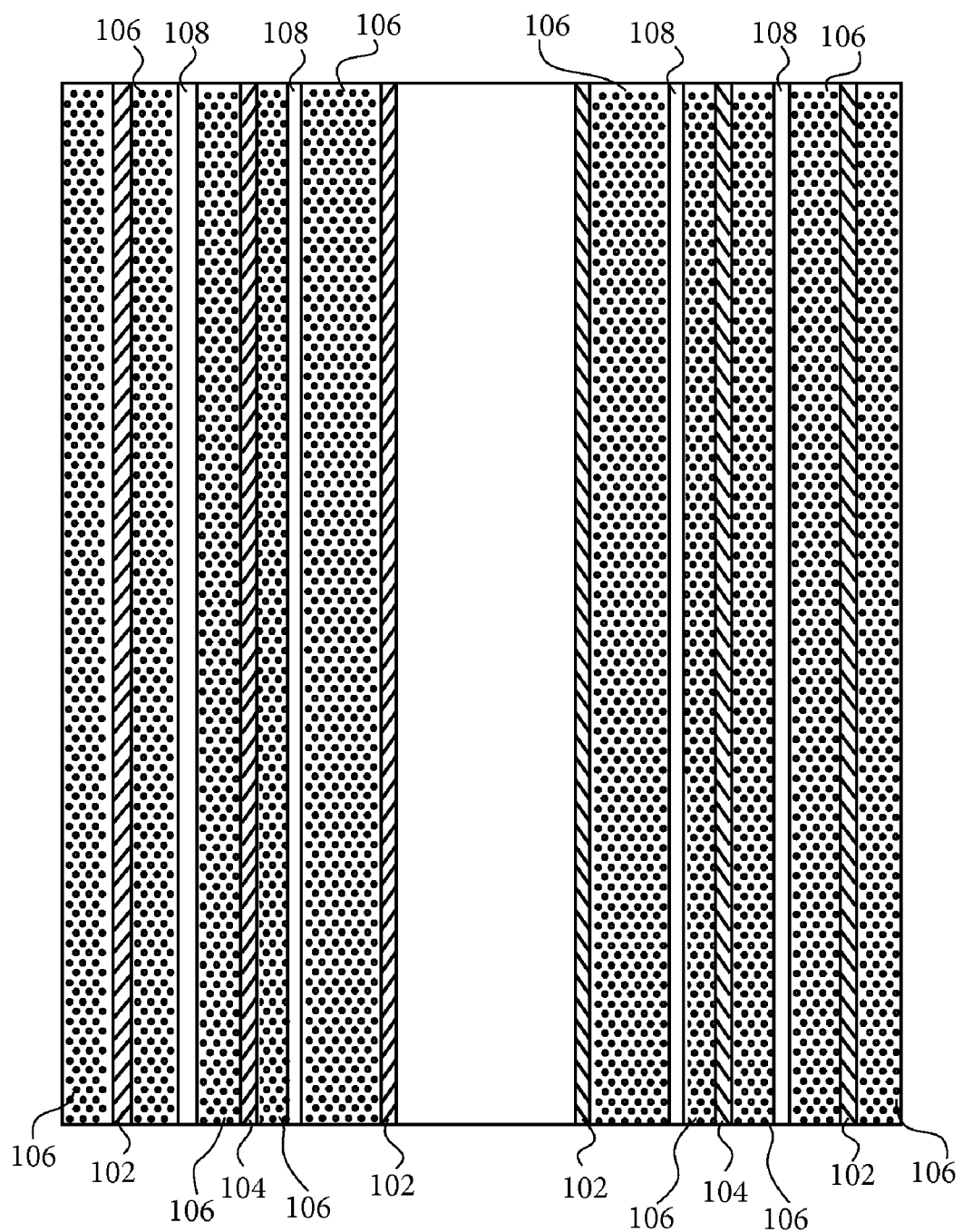
FIG. 7 illustrates a representative side sectional view (XY plane of an alternate DLC or supercapacitor design in accordance with a cylindrical embodiment of the invention.

To show the versatility in designs for this invention, FIG. 7 depicts an alternate double-layer capacitor design using the same claims in a cylindrical configuration. The inner most part 102 is a conductive current collector tubing. The next layer of material radially outward is multiple layers of nano-fiber filaments 106 wound on the tubular current collector. A thin layer of barrier film 108 is applied on top of the filaments to act as a electrical insulator, but has perforations to allow the voltage field between the two oppositely charged electrodes to experience maximum voltage difference. Then, another layer of filaments is wound on top of the barrier film that would be oppositely charged from the first layer of filaments. During the winding of this second layer, a thin conductive layer of material or conductive posts are added in the middle of the winding as current collectors. One end of the conductive cylinder current conductor or posts are connected to a conductive ring or plate at one end of the this device. This ring or plate will have a connection point to connect to other cells or to the exterior terminal. Then, another barrier film is applied over this second filament layer. The next layer of filaments will be the opposite in charge from the layer below. Then, another layer of barrier film and another layer of filaments on top of the barrier film, and so on. Oppositely charged current collectors will have their bus on opposite ends of the cylinder. This design can have shapes other than round. It could be square in the X-Y plane, so that if packed next to each other in a rectangular case, there would be less wasted space.

Figure 8:
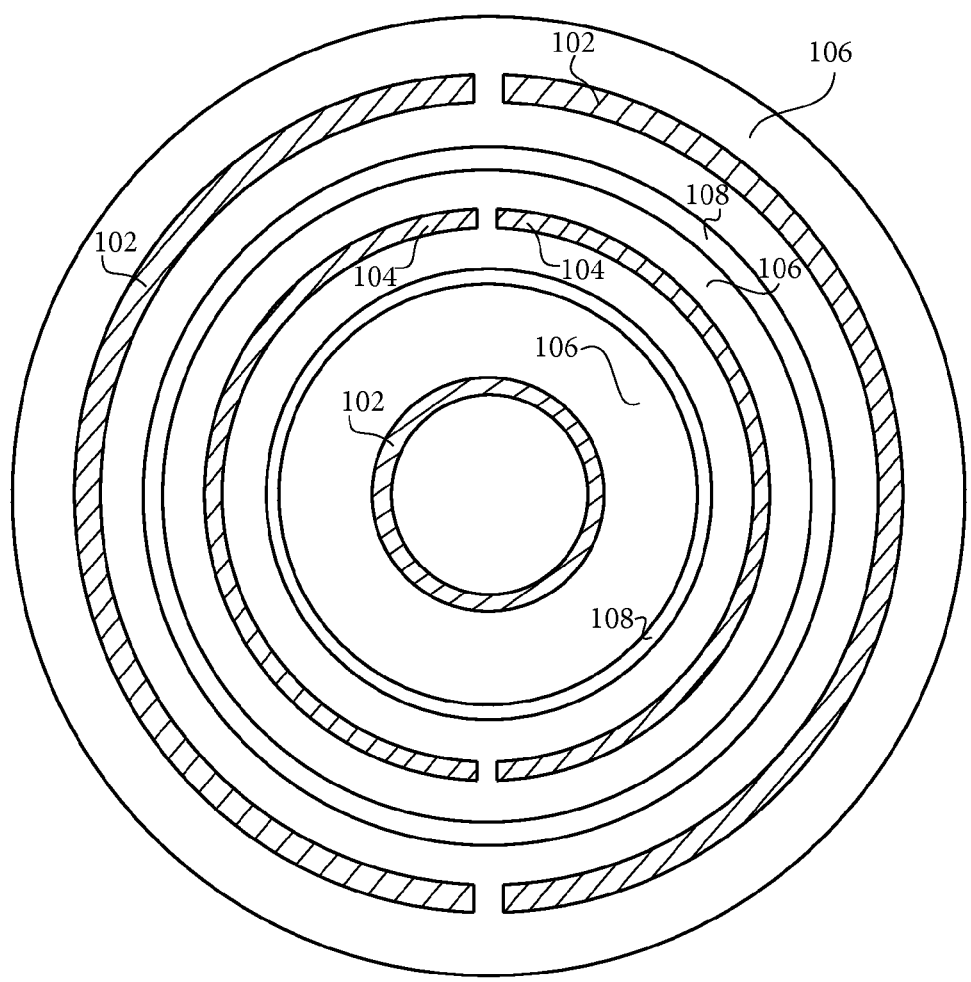
FIG. 8 illustrates a representative top sectional view (XZ plane) of the alternate DLC or supercapacitor design in accordance with a cylindrical embodiment of the invention.

FIG. 8 is the same design as in FIG. 7, but in the X-Z cross-sectional view. The current collector posts 102 and 104 are in multiple numbers or can be a solid cylinder with perforations or it can be a cylindrical wire mesh or a hybrid for the filaments to wrap around it. The higher the current or power demands, the more conductor cross-sectional area would be required to minimize over-heating. The number of layers of filaments depends on application.

In an embodiment, the nano-fibers can be carbon nanotubes. Embodiments of the nano-fibers that can be used in supercapacitor 100, and the methods for making the same, have been described in U.S. Patent Application Publication 2007/0243124 filed on Sep. 30, 2005, entitled "Polymer-Free Carbon Nanotube Assemblies (Fibers, Ropes, Ribbons, Films)", which is incorporated by reference herein in its entirety. In this case, the carbon nanotube filaments were wet-spun, but the nanotube filaments in an embodiment of the invention can be dry-spun or by other means to produce a yarn or filament from nano-fibers of different materials that have electrical charge storage capability.

In technology validation of an embodiment of the invention, the carbon nanotube filaments were created by a wet-spinning process referred to herein as the polymer-free flocculation spinning (PFFS) process. CNT filaments created from the PFFS process have extremely high surface areas (and thus high charge storage) and increased mechanical properties (e.g., strength), which make them ideal for use in supercapacitors to be used in harsh environments. In an embodiment, the carbon nanotube filaments are conductive. In an embodiment, the nanotube fibers are approximately 15 to 20 µm in diameter. In another embodiment, the nanotube fibers can be either hollow or solid fibers comprising nanotubes, the nanotubes generally including single-walled carbon nanotubes or double-walled carbon nanotubes.

The advantages of a supercapacitor 100 comprised of a bundle of nano-fiber filaments 106 arranged in tightly packed unidirectional columns, and where the tightly packed columns that are aligned substantially in parallel and uni-directionally from the current collectors. First, when the stored energy is drawn from supercapacitor 100, the uni-directionally arranged fibers provide a preferential path and direction for electrical charges to migrate. Accordingly, connecting both ends of the plurality of electrodes 106 to plates 102, 104 can result in increased power inlet/outlet. Further, in contrast to prior art conventional supercapacitors utilizing carbon particulates, which may accumulate and retain a percentage of charge due to greater internal impedance, the unidirectional and aligned nanotube fibers of an embodiment of the invention enable a higher percentage of charges to drain, and therefore provide a higher amount of usable energy.

A distinctive advantage of a supercapacitor comprised of a bundle of nano-fiber or nanotube filaments arranged in tightly packed unidirectional columns which are aligned substantially in parallel and uni-directionally to a separator film in accordance with an embodiment of the invention, is the very large total effective and usable surface area that may be provided by very densely packed and wetted nano-fiber or nano-tube filaments. Specifically, the yarn spinning process creates an intertwined nano-fiber or nanotube filament that results in an easy-to-handle filament composed of nanotube fibers that can be used as the plurality of electrodes 106, each of the nano-fiber or nano-tube filaments still having extremely large effective surface areas. Accordingly, a large number of electrodes 106 can be densely packed in nearly any given configuration for supercapacitor 100, which greatly increases the efficiency and practical effectiveness of supercapacitor 100 when compared to other prior art supercapacitors. In an embodiment, depending upon the stored energy required, there could be many millions of nano-fiber or nanotube filaments used in supercapacitor 100 in three dimensions, wherein each individual nano-fiber or nanotube filament acts as an individual electrode that works together with the other nanotube fibers to collectively store high amount of overall charge for supercapacitor 100. This is the reason for such high accessible surface area compared to conventional supercapacitors using one surface layer of activated carbon per electrode.

A third distinctive advantage of a supercapacitor 100 in accordance with an embodiment of the present invention is the increased effective electrode surface area and the small effective distance between the opposing charges yield an increased capacitance. In addition, because the filamentous nanotube fibers in the plurality of yarns or filaments have diameter and spacing comparable to the dimension of an ion of the electrolyte, the ions can completely populate the interstices between the nano-fibers within a filament. The higher performance supercapacitors using activated carbon, typically have 1500 m²/g in specific-area, and are in the 6-8 kWh/kg range. SWCNT filaments have achieved over 250 Wh/kg in the lab using the same electrolyte. If packaging weight is ⅔ of the finished supercapacitor, then the specific-energy drops down to about 83 Wh/kg; which becomes 10-13× higher in specific-energy than the best supercapacitor on the market. The estimated specific-area for the electrode of this invention is around 12,500 m2/g. This is about an 8× higher in surface area than activated carbon used in conventional supercapacitors, which corresponds to 10-13× higher in specific-energy.

A fourth distinctive advantage of a supercapacitor comprised of a bundle of nano-fiber or nanotube filaments arranged in tightly packed unidirectional columns which are aligned substantially in parallel and uni-directionally to a separator film in accordance with an embodiment of the invention, is the significantly larger usable electrode thickness (indicated as "h" in FIG. 2 and FIG. 3) between the current collector plate (102 or 104) and the separator film. Typically, effective and usable electrode thicknesses of conventional supercapacitors is less than 0.25 mm thick; while 2 mm and greater thicknesses are achievable in an embodiment of the present invention. More specifically, the thickness as set by the number of layers of the plurality of electrodes 106 can controlled and manipulated to conform to the desired use. This ability to control the depth and number of electrodes 106 used in supercapacitor 100 is not, to the best of the inventor's knowledge, found in any other supercapacitor designs that currently exist. This is the 3$^{rd}$ dimension in energy storage described earlier. This also contrasts with conventional supercapacitors whose effective electrode thicknesses are constrained by the ability of liquid electrolyte to wet the surface. Since electrons can only accumulate on outer surfaces of activated carbon, there is no reason to make the activated carbon thicker than the thinnest layer that can mechanically support the designed structure of the supercapacitor.

In summary, the advantages of a supercapacitor comprised of a bundle of nanotubes or nano-fibers arranged in a tightly packed unidirectional columns which are aligned substantially in parallel and uni-directionally to a separator film as found in an embodiment of the invention are multifold and result collectively in a supercapacitor with significantly greater accessible surface area that is condensed into a smaller volume, significantly greater conductivity within the CNT medium, and having significantly greater effective usable electrode thickness thereby resulting in overall greater effective storage capacity per unit mass and volume than conventional supercapacitors.

The selection of electrolyte is critical in ensuring high amount of charge storage in a supercapacitor. In an embodiment of the invention, the electrolyte is selected by its highest voltage breakdown parameter which increases operating voltage and thus, energy storage. Ionic liquids can operate above 6V, and has a very broad operating temperature range (−40C to +250C). The energy storage of a capacitor is dependent on the total capacitance and voltage defined by the following equation where C represents the capacitance of the capacitor and V represents the voltage between the electrodes of the capacitor:

$$E = \frac{1}{2}CV^2$$

In another embodiment of the invention, the electrolyte is selected by its lowest viscosity parameter, which allows increased penetration of the electrolyte's cations and anions into the tight space between individual nanotubes that form filaments.

In another embodiment, the electrolyte is selected by the smaller size of its molecules (cations and anions) parameter, which allows additional increased penetration of electrolyte's cations and anions into the tight space between individual nanotubes that form fibers, where dimensions of such spaces are comparable with the dimensions of electrolyte's cations and anions.

In another embodiment, the electrolyte is selected by its lowest and highest working temperature parameter, which allows usage of a supercapacitor over a wide range of temperatures for different indoor, outdoor, and specific applications that may involve a higher temperature environment.

In another embodiment, the electrolyte is in a gaseous or vapor form to improve surface wet-out in high-density fiber packing. In another embodiment, the electrolyte is an oxide dielectric for operating temperatures above 140° C. In yet another embodiment, the electrolyte is a high-temperature liquid for operating temperatures above 140° C.

The electrolyte used in conventional supercapacitors can be aqueous, organic or inorganic solution with voltages from 1-3 volts. In an embodiment, the electrolyte can be the above, or other higher voltage electrolyte such as ionic liquids; which also has a broader operating temperature range.

In an embodiment, the electrolyte can be vacuum-impregnated into the plurality of electrodes 106, so as to result in electrolyte wetting the full surfaces of and filling the volumes within the carbon nanotubes comprising the fiber electrode. In another embodiment, the plurality of electrodes 106 can be dipped into an electrolyte bath to fully wet the plurality of electrodes 106.

Current collectors 102, 104 can be formed from any conductive material, not limited to metals or other conductive materials known to those having ordinary skill in the art. In an embodiment, plates 102, 104 can be made of a metal including, but not limited to aluminum, steel, copper, or silver. In another embodiment, plates 102, 104 can be carbon nanotubes made with a conductive polymer. FIG. 2 illustrates current collectors 102, 104 as being U-shaped, however, they can have any other shape as long as at least one of the ends of the plurality of electrodes 106 can be bonded, soldered, brazed or electrically connected to at least one part of the current collector.

Conductive adhesive 110 materials can include any appropriate conductive material known and used by those having ordinary skill in the art. In an embodiment, conductive adhesive 110 is a bonding agent loaded with graphene or CNT. While a conductive adhesive 110 is used in the embodiment illustrated in FIG. 3, it is to be understood that other alternative methods of connecting the plurality of electrodes 106 to current collectors 102, 104 can be used as well. Overall, any method for attaching the plurality of electrodes 106 to plates 102, 104 for electrical conduction can be used as would be known by one having ordinary skill in the art and still fall within the scope of this invention.

Separator or barrier film 108 materials can include, but are not limited to, porous papers, porous or perforated polymer films, and porous fabrics. In an embodiment where the filaments are wound onto a mandrel, the barrier film can be heat-shrinkable tubing that would be sleeved over the winding, and heat-shrunk for a tight fit. Then, additional filaments can be wound over the barrier film.

In an embodiment, the superconductor 100 can include a protective containment casing made of fiber reinforced high-temperature engineered plastic material. In another embodiment, the casing can also be made of non-conductive nanotube fibers reinforcing a resin matrix. In yet another embodiment, the casing can include recessed terminals to reduce accidental shorting-out. In yet another embodiment, an internal electro-mechanical on-off switch can also be added to the inside or outside the casing to physically separate the electric bus that is connected to the current collectors. This would eliminate accidental exterior short-outs and minimize current leakage during storage or non-use.

In an embodiment, once the plurality of electrodes 106 have been wetted by the electrolyte, they can be packaged into an electrically-insulated pouch with one side of the pouch perforated for electrolyte continuity with the opposing electrode. Excess electrolyte can be forced out of the perforation prior to sealing inside the superconductor 100 casing.

Due to the high level of energy to be stored in this new generation DLC, an additional safety feature is introduced in this design. It can be manually or automatically set. For manual setting, either a dial to turn or a slide to push, the internal power bus bar can be manually disconnected to the exterior terminal. It would be set on disconnected during shipping, storage or non-use periods to minimize current leakage or accidental shorting-out. In the automatic version, an electronic circuit will disconnect the bus to the exterior terminal at certain G-loading. The automatic version can have a manual switch for the operator to use for extended non-use periods to avoid current leakage.

Although the present invention has been shown and described in detail with regard to only a few exemplary embodiments of the invention, it should be understood by those skilled in the art that it is not intended to limit the invention to the specific embodiments disclosed. Various modifications, omissions, and additions may be made to the disclosed embodiments without materially departing from the novel teachings and advantages of the invention, particularly in light of the foregoing teachings. Thus, it is intended to cover all such modifications, omissions, additions, and equivalents as may be included within the spirit and scope of the invention as defined by the following claims.

The invention claimed is:

1. A double-layer capacitor using nano-fiber filaments comprises,
   electrode frames;
   a plurality of electrodes;
   a separator film;
   an electrolyte;
   a conductive joining method;
   the electrode frames, having two opposing ends, consists of a positive current collector and a negative current collector;
   a positive electrode assembly;
   a negative electrode assembly;
   the plurality of electrodes being connected to the positive current collector and the negative current collector by the conductive joining method;
   the plurality of electrodes consists of a plurality of filaments; and
   the nano-fiber filaments comprising a plurality of nano-fibers.

2. The double-layer capacitor using nano-fiber filaments as claimed in claim 1 comprises,
   the positive electrode assembly being defined by the positive current collector and the plurality of electrodes;
   the negative electrode assembly being defined by the negative current collector and the plurality of electrodes; and
   the separator film being positioned between and separating the positive electrode assembly and the negative electrode assembly.

3. The double-layer capacitor using nano-fiber filaments as claimed in claim 1 comprises,
   the plurality of electrodes being connected to the positive current collector and the negative current collector between the two opposing ends by the conductive adhesive; and
   the plurality of electrodes being arranged in parallel relationship to the separator film.

4. The double-layer capacitor using nano-fiber filaments as claimed in claim 3 comprises,
   the plurality of electrodes being densely packed between the positive current collector and the separator film;
   the plurality of electrodes being densely packed between the negative current collector and the separator film; and
   the plurality of electrodes being three dimensionally shaped consistently with the electrode frames, the positive current collector, and the negative current collector.

5. The double-layer capacitor using nano-fiber filaments as claimed in claim 1 comprises,
   the electrolyte being in contact with and interposed between the plurality of electrodes.

6. The double-layer capacitor using nano-fiber filaments as claimed in claim 5 comprises,
   the electrolyte being a non-conductive material below an electrical breakdown voltage with large ion concentration;
   the electrolyte being a non-conductive material in a physical state selected from the group consisting of liquids and gels; and
   the electrolyte having ion concentrations in contact and being in contact with each electrode of the plurality of electrodes to transfer a voltage field.

7. The double-layer capacitor using nano-fiber filaments as claimed in claim 1 comprises,
   the positive current collector being made from a conductive material selected from the group consisting of conductive metal and conductive polymer;
   the negative current collector being made from a conductive material selected from the group consisting of conductive metal and conductive polymer; and
   the plurality of filaments being a filament selected from the group consisting of yarns, threads, filaments, strings and the like.

8. A double-layer capacitor using nano-fiber filaments comprises,
   electrode frames;
   a plurality of electrodes;
   a separator film;
   an electrolyte;
   a conductive joining method;
   the electrode frames, having two opposing ends, consists of a positive current collector and a negative current collector;
   a positive electrode assembly;
   a negative electrode assembly;
   the plurality of electrodes being connected to the positive current collector and the negative current collector by the conductive joining method;
   the plurality of electrodes consists of a plurality of filaments;
   the nano-fiber filaments comprising a plurality of nano-fibers;
   the positive electrode assembly being defined by the positive current collector and the plurality of electrodes;

the negative electrode assembly being defined by the negative current collector and the plurality of electrodes; and the separator film being positioned between and separating the positive electrode assembly and the negative electrode assembly.

9. The double-layer capacitor using nano-fiber filaments as claimed in claim 8 comprises, the plurality of electrodes being connected to the positive current collector and the negative current collector between the two opposing ends by the conductive adhesive; and the plurality of electrodes being arranged in parallel relationship to the separator film.

10. The double-layer capacitor using nano-fiber filaments as claimed in claim 9 comprises, the plurality of electrodes being densely packed between the positive current collector and the separator film;

the plurality of electrodes being densely packed between the negative current collector and the separator film; and the plurality of electrodes being three dimensionally shaped consistently with the electrode frames, the positive current collector, and the negative current collector.

11. The double-layer capacitor using nano-fiber filaments as claimed in claim 8 comprises, the electrolyte being in contact with and interposed between the plurality of electrodes.

12. The double-layer capacitor using nano-fiber filaments as claimed in claim 11 comprises, the electrolyte being a non-conductive material below an electrical breakdown voltage with large ion concentration;

the electrolyte being a non-conductive material in a physical state selected from the group consisting of liquids and gels; and the electrolyte having ion concentrations in contact and being in contact with each electrode of the plurality of electrodes to transfer a voltage field.

13. The double-layer capacitor using nano-fiber filaments as claimed in claim 8 comprises, the positive current collector being made from a conductive material selected from the group consisting of conductive metal and conductive polymer;

the negative current collector being made from a conductive material selected from the group consisting of conductive metal and conductive polymer; and the plurality of filaments being a filament selected from the group consisting of yarns, threads, filaments, strings and the like.

14. A double-layer capacitor using nano-fiber filaments comprises, electrode frames;
a plurality of electrodes;
a separator film;
an electrolyte;
a conductive joining method;
the electrode frames, having two opposing ends, consists of a positive current collector and a negative current collector;

a positive electrode assembly;
a negative electrode assembly;

the plurality of electrodes being connected to the positive current collector and the negative current collector by the conductive joining method;

the plurality of electrodes consists of a plurality of filaments;

the nano-fiber filaments comprising a plurality of nano-fibers;

the positive electrode assembly being defined by the positive current collector and the plurality of electrodes;

the negative electrode assembly being defined by the negative current collector and the plurality of electrodes;

the separator film being positioned between and separating the positive electrode assembly and the negative electrode assembly;

the plurality of electrodes being connected to the positive current collector and the negative current collector between the two opposing ends by the conductive adhesive; and the plurality of electrodes being arranged in parallel relationship to the separator film the plurality of electrodes being densely packed between the positive current collector and the separator film;

the plurality of electrodes being densely packed between the negative current collector and the separator film.

15. The double-layer capacitor using nano-fiber filaments as claimed in claim 14 comprises, the plurality of electrodes being three dimensionally shaped consistently with the electrode frames, the positive current collector, and the negative current collector.

16. The double-layer capacitor using nano-fiber filaments as claimed in claim 15 comprises, the electrolyte being a non-conductive material below an electrical breakdown voltage with large ion concentration;

the electrolyte being a non-conductive material in a physical state selected from the group consisting of liquids and gels; and the electrolyte having ion concentrations in contact and being in contact with each electrode of the plurality of electrodes to transfer a voltage field.

17. The double-layer capacitor using nano-fiber filaments as claimed in claim 14 comprises, the electrolyte being in contact with and interposed between the plurality of electrodes.

18. The double-layer capacitor using nano-fiber filaments as claimed in claim 14 comprises, the positive current collector being made from a conductive material selected from the group consisting of conductive metal and conductive polymer;

the negative current collector being made from a conductive material selected from the group consisting of conductive metal and conductive polymer; and the plurality of filaments being a filament selected from the group consisting of yarns, threads, filaments, strings and the like.

* * * * *